US006308457B1

(12) United States Patent
Howell

(10) Patent No.: US 6,308,457 B1
(45) Date of Patent: Oct. 30, 2001

(54) SOLUTION AND METHOD OF TREATMENT FOR GOLDEN PINE SYNDROME

(76) Inventor: C. Neal Howell, 10851 Ramsey Rd. Extension, Grand Bay, AL (US) 36541

( * ) Notice: Subject to any disclaimer, the term of this patent is extended or adjusted under 35 U.S.C. 154(b) by 0 days.

(21) Appl. No.: 09/416,045

(22) Filed: Oct. 12, 1999

(51) Int. Cl.[7] .................................................. A01G 7/06
(52) U.S. Cl. ............................................................ 47/58.1
(58) Field of Search ............................................... 47/58.1

(56) References Cited

U.S. PATENT DOCUMENTS

| | | | |
|---|---|---|---|
| 2,781,612 | * | 2/1957 | Dugan . |
| 3,660,069 | * | 5/1972 | Backlund ................................. 71/33 |
| 4,436,545 | * | 3/1984 | Lyons, Jr. et al. ...................... 71/25 |
| 5,749,935 | * | 5/1998 | Takehara et al. ....................... 71/62 |

FOREIGN PATENT DOCUMENTS

24778-T   *   4/1983   (HU) .

* cited by examiner

Primary Examiner—Peter M. Poon
Assistant Examiner—Jeffrey L. Gellner
(74) Attorney, Agent, or Firm—Robert L. Wolter, Esq.; Beusse Brownlee Bowdoin & Wolter, PA

(57) ABSTRACT

This invention is for a method and/or solution for treatment of Golden Pine Syndrome. The mixture ideally is a diluted acidic solution that contains 3% to 6% iron (iron sulfate) by weight, 1% to 4% by weight of zinc (zinc sulfate), 0.1 to 4.0% manganese (in the form of manganese sulfate or oxide) and 10% or less of sulfuric acid. The remaining solution by weight is water. This solution is derived from waste pickle liquor disposed from a ferrous galvanizing process.

17 Claims, 1 Drawing Sheet

SOLUTION AND METHOD OF TREATMENT FOR GOLDEN PINE SYNDROME

FIELD OF THE INVENTION

The field of this invention pertains to the treatment of golden pine syndrome of pine trees and decline of other trees. More specifically, this invention pertains to the production of such a solution from waste pickle liquor discarded from metal galvanizing operations.

BACKGROUND

"Golden pine syndrome," or "Florida Pine Decline," refers to a condition of pine trees or other native trees resulting from chlorosis, which is a deficiency in chlorophyll production of a plant. Chlorosis is the result of the use of alkaline irrigation water containing high concentrations of calcium. This phenomena is particularly prevalent among those pine or other native trees located on golf courses. Metals such as iron, manganese and zinc are essential nutrients for the production of chlorophyll in plants. However, calcium rich water inhibits a plant's ability to process these nutrients for the production of chlorophyll.

Calcium ions have a similar charge as metal ions iron, manganese and zinc; therefore, the increased amount of calcium repels the metal ions, physically preventing reaction of the metals for the production of chlorophyl. In fact chlorophyll plants must live off stored energy reserves which accounts for the slow but steady decline of affected trees. Calcium is a "luxury consumption" element so it tends to be more readily absorbed than other elements. Calcium consequently blocks reactions of metals within the plants retarding the production of chlorophyl.

Accordingly, pine trees' food sources have been supplemented with mixtures of iron sulfate, zinc sulfate and manganese sulfate with water for treatment of pine trees. Such an aqueous solution included 5% water soluble iron, 0.4% manganese, and 2% zinc. These metals provide an aqueous solution in the form of acidic solutions of sulfates. In aqueous solutions, these sulfates ionize providing increased amounts of iron, zinc and manganese ions for chlorophyl production desperately needed by the pine tree. However, there is a need for an inexpensive source of these metal supplements.

The U.S. Pat. No. 4,436,545 discloses the process for the disposal of waste pickle liquor in the production of fertilizer. The '545 patent discloses a process whereby waste production from acid treatment of ferrous metals is treated with a nitrogen-rich compound (urea) to produce a fertilizer for plants. The end product desired has a 6% by weight iron content and a 15% by weight nitrogen content. The pickling process itself is described in the '545 patent. Urea is added to the waste pickle liquor by adding one part by weight urea to two parts by weight pickle liquor to achieve the desired percent by weight of iron. Unfortunately the commercial sources of urea are expensive. In addition, the pH of this solution is about 2 which may not be sufficiently acidic to lower the pH of the soil to a more tolerable level for the trees. Moreover, such a solution does not contain zinc or manganese which has been found to be essential in the treatment of Golden Pine Syndrome.

SUMMARY OF THE INVENTION

In view of the foregoing, it is an object of the present invention to provide a solution or mixture for the treatment of chlorosis in trees. Another object of this invention is to produce such a solution having manganese, zinc and iron. Still another object of the invention, is to provide an inexpensive source of zinc and iron in the form of waste pickle liquor from galvanizing iron operations.

These and other objectives are achieved by adding manganese to waste pickle liquor procured from iron galvanizing operations. After the addition of manganese, the solution may be diluted with water for acceptable concentrations of metals and pH levels. The mixture is used to treat pine and other native trees by injecting predetermined doses of the mixture spaced annularly about the base of the tree.

DETAILED DESCRIPTION OF THE INVENTION

Figure 1:
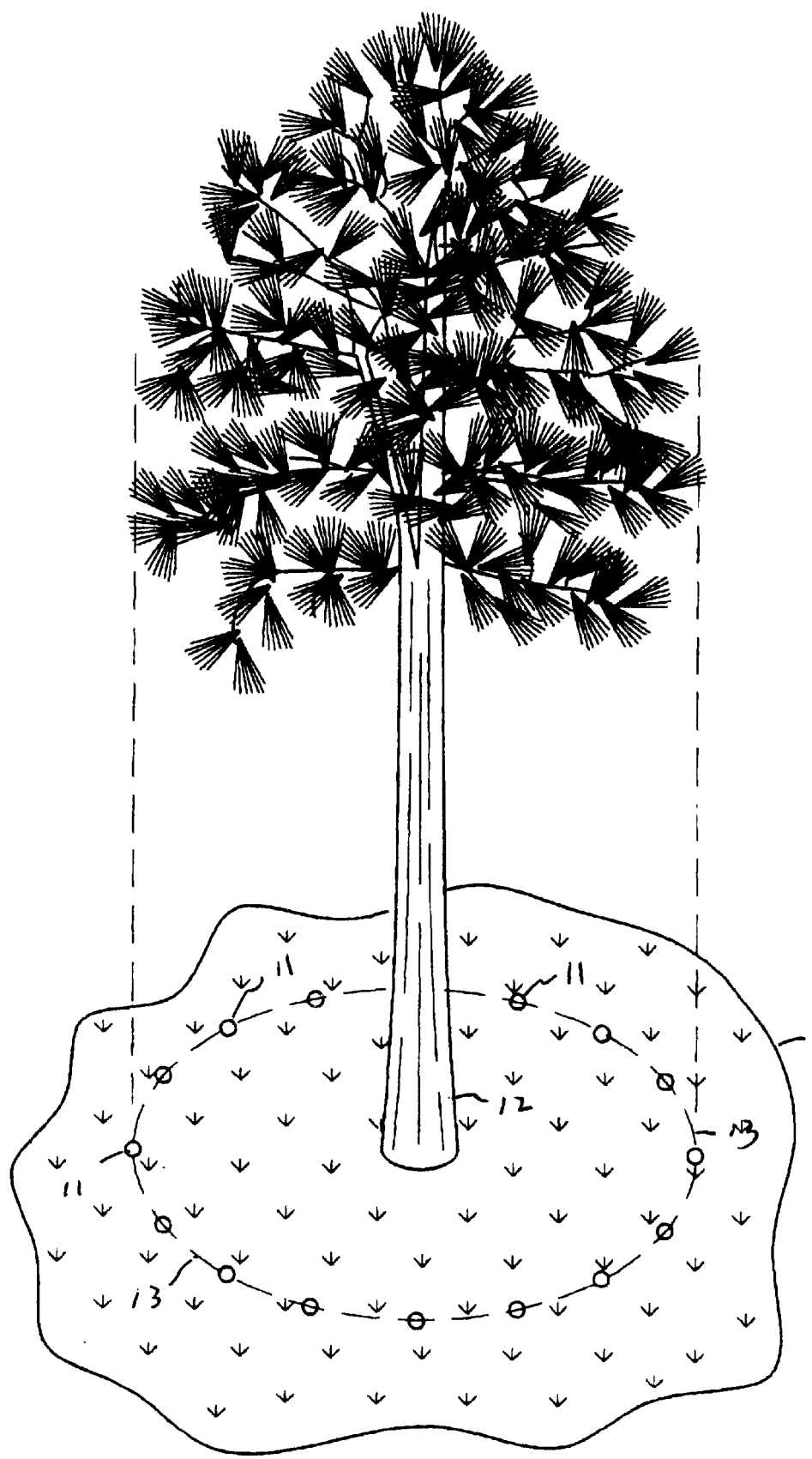
FIG. 1 is a perspective view of a tree with injection points.

The process of cleansing the surface of metals during the manufacture of metal articles is disclosed in the U.S. Pat. No. 4,436,545. Generally, the ferrous metal articles are soaked in an acidic aqueous bath (pickle liquor) to remove oxide scales formed on the metal articles. This "pickling" procedure is also performed on galvanized metal articles, which have been coated with zinc to make the metal articles rust resistant. Over a period of time, the acid nature of the bath weakens and is ineffective for the pickling process. The acid bath forms solutions of iron sulfate and zinc sulfate.

The disposal of spent pickle liquor from galvanizing production lines has been a continuous problem, as there has been no ready markets for the raw material such as there are for pickle liquors as disclosed in the '545 patent that do not contain zinc. The zinc content (usually about 1% to 4% by weight) precludes its use in water treatment and the overall low nutrient levels prevent its use in agriculture as a fertilizer.

The use of waste pickle liquor from a galvanizing process is particularly suited for treatment of Golden Pine Syndrome. The '545 patent requires the addition of urea which raises the pH level of the treatment solution. A lower pH, however, enhances the reactivity of the solution in the calcium rich soils. Moreover, the use of the nitrogen has proven of little benefit and is counter productive as it raises the pH of the solution.

Sufficient amounts of water, manganese sulfate, or manganese oxide, are added to the pickle liquor to make the solution suitable for treatment of Golden Pine Syndrome. The conditions under which the water and manganese are added may vary. Some procedures produce hot pickle liquor at a temperature of 140° Fahrenheit. Others may produce the pickle liquor at ambient temperature. Under optimal conditions, the manganese is added while the temperature is in excess 100° Fahrenheit.

Depending on the amount of water and manganese added to the pickle liquor, the concentration of the active constituents may vary. Preferably, the iron concentration by may vary from approximately 3% to 6%, the zinc concentration may vary from approximately 1% to 4%, the manganese concentration may vary from approximately 0.04% to 1.0% and the sulfuric acid concentration is approximately 10%. These concentrations are measured as a percentage of the total weight of the solution. These concentrations are not intended to limit the invention to the specific disclosed concentrations, but are intended to be representative of working embodiments of the invention.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only the spirit and scope of the appended claims.

The manganese may be added at ambient temperature but the mixing time is increased. The agitation time period will vary inversely to the temperature of the pickle liquor. The higher the temperature, the less amount of time for agitation is required for mixing the manganese to the solution. Thus agitation times may vary, but must be maintained until the manganese is completely dissolved. When adding the manganese to a pickle liquor having a temperature greater than 100° Fahrenheit, agitation is continued for ten minutes subsequent to the addition of the last amount of manganese.

As noted above, the water and manganese is added to the waste pickle liquor to the above referenced desired concentrations. The solution is injected into the ground adjacent an affected tree. As shown in FIG. 1, the injections represented by injection points 11 are preferably spaced equidistant apart annularly about the base of a tree 12. In addition, the injections are spaced from the base of the tree and disposed toward a perimeter 13 defined by the canopy of the tree. The total dosage of the solution injected may range from 0.1 gallons to 45 gallons for a single tree, with an average dosage being 18 gallons. The total amount of solution to be injected is calculated from the diameter of the tree trunk. The amount determined may be also depend on the stage of the syndrome, but generally 1½ gallons of solution per diameter inch of the tree may be used to treat the tree.

What is claimed is:

1. A method for treatment of pine trees suffering from chlorisis, comprising the steps of:
    (a) adding manganese to a waste pickle liquor provided from an iron galvanizing operation to a predetermined concentration and said pickle liquor having iron sulfate, zinc sulfate and sulfuric acid as by products from said galvanizing operation; and
    (b) diluting said pickle liquor with water forming a solution for treatment of said affected pine tree; and,
    (c) injecting said solution into the ground adjacent said base of said pine tree.

2. A method for treatment of trees as defined in claim 1 wherein said iron content of the solution is approximately 3% to 6% by weight.

3. A method for treatment of trees as defined in claim 1 wherein said zinc content of the solution is approximately 1% to 4% by weight.

4. A method for treatment of trees as defined in claim 1 wherein said manganese content of the solution is approximately 0.04% to 1.0% by weight.

5. A method for treatment of trees as defined in claim 1 wherein said sulfuric acid content of the solution is approximately 10% by weight.

6. A method for treatment of trees affected by chlorosis, comprising:
    (a) adding manganese to a waste pickle liquor provided from an iron galvanizing operation to a predetermined concentration and said pickle liquor having iron sulfate, zinc sulfate and sulfuric acid as by products from said galvanizing operation; and,
    (b) diluting said pickle liquor with water forming a solution for treatment of said affected pine tree whereby said solution has a concentration of manganese in the range of 0.04% to 1% by weight.

7. A method for treatment of trees affected by Chlorosis, as defined in claim 6 further including the step of injecting predetermined doses of the solution in soil, and said injected doses being spaced annularly about the tree.

8. A method for treatment of trees as defined in claim 6 wherein said iron content of the solution is approximately 3% to 6% by weight.

9. A method for treatment of trees as defined in claim 6 wherein said zinc content of the solution is approximately 1% to 4% by weight.

10. A method for treatment of trees as defined in claim 6 wherein said manganese content of the solution is approximately 0.04% to 1.0% by weight.

11. A method for treatment of trees as defined in claim 6 wherein said sulfuric acid content of the solution is approximately 10% by weight.

12. A solution for treating trees suffering from chlorosis, comprising a waste pickle liquor having manganese added thereto to a predetermined concentration and said waste pickle liquor having been diluted to obtain a desired concentration of iron, zinc and manganese.

13. A solution as defined in claim 12 further having iron and sulfuric acid.

14. A solution as defined in claim 13 wherein said iron content is approximately 3% to 6% by weight.

15. A solution as defined in claim 13 wherein said zinc content is approximately 1% to 4% by weight.

16. A solution as defined in claim 13 wherein said manganese content of the solution is approximately 0.04% to 1% by weight.

17. A solution as defined in claim 13 wherein said sulfuric acid content of the solution is approximately 10% by weight.

* * * * *